Dec. 1, 1964   D. S. BAKER   3,159,158
BODY TEMPERATURE TEMPERING DEVICE
Filed June 20, 1958   3 Sheets-Sheet 1

INVENTOR
David S. Baker
BY
Kenyon & Kenyon
ATTORNEYS

Dec. 1, 1964                D. S. BAKER                3,159,158
BODY TEMPERATURE TEMPERING DEVICE
Filed June 20, 1958                           3 Sheets-Sheet 2

INVENTOR
David S. Baker
BY
ATTORNEYS

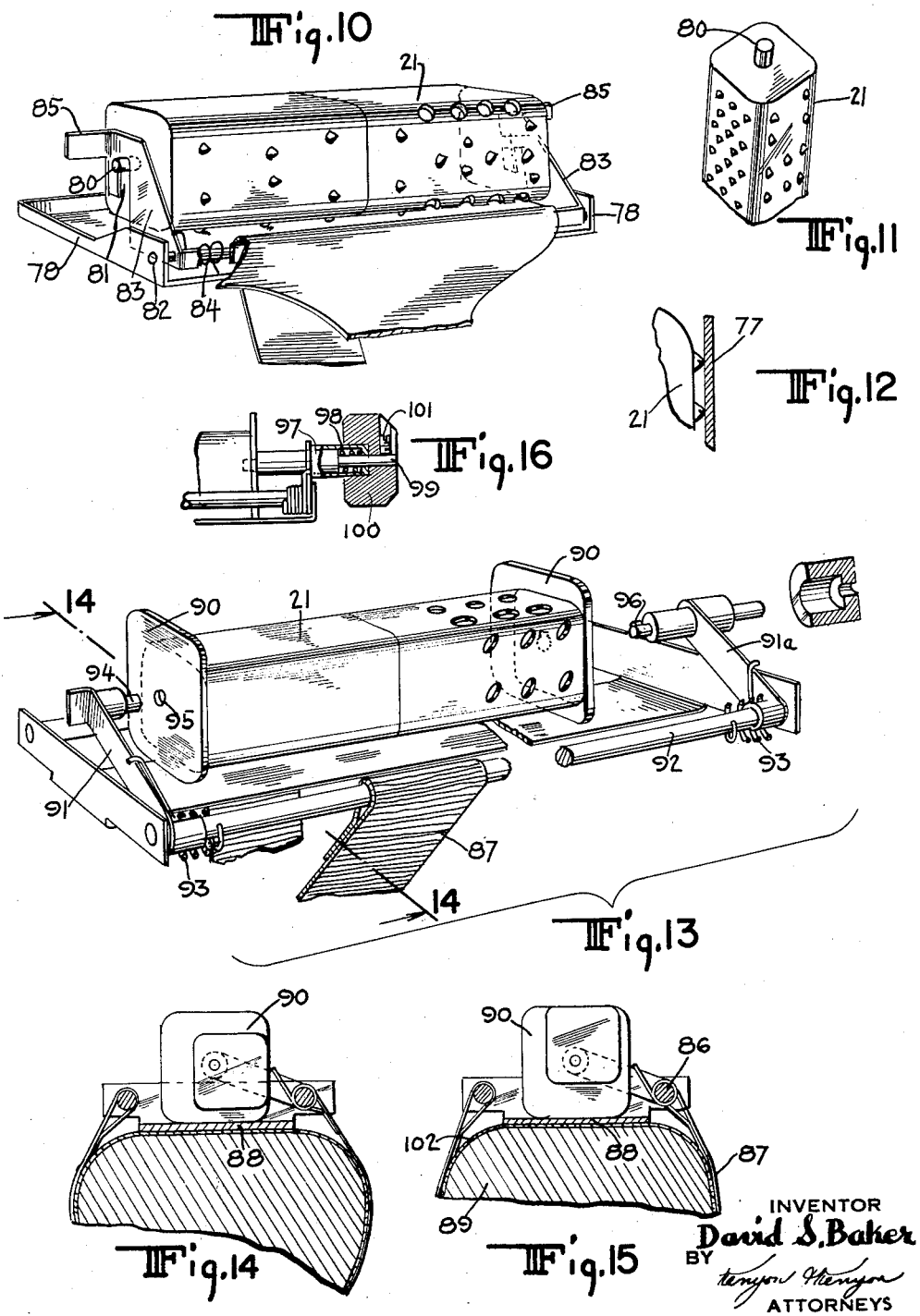

United States Patent Office 3,159,158
Patented Dec. 1, 1964

3,159,158
BODY TEMPERATURE TEMPERING DEVICE
David S. Baker, 475 5th Ave., New York, N.Y.
Filed June 20, 1958, Ser. No. 743,233
7 Claims. (Cl. 126—208)

This invention relates to body temperature tempering devices and relates more particularly to body warming or cooling devices in the form of a small unit which can be carried on the person. Application to body warming will first be described.

Heretofore there have been made and sold small body warming devices adapted to be carried in one's pocket primarily for the purpose of serving as a hand warmer. Devices of this type comprise a casing within which there is a small burner and a fuel reservoir for containing a supply of fuel that is furnished to the burner. In order to protect the apparel of the user, a cover for the burner is provided which has suitable ventilating apertures therein so that a supply of oxygen from the air may serve to maintain continued combustion. In the usual hand warming device the cover is removable so that the burner may be lighted and so as to permit replenishment of the fuel supply. In devices of this type the burner is one wherein a foraminous material, which may be a fabric made of incombustible material, carries a catalyst such that vapor from the fuel burns so as to impart a glow to the foraminous material. The rate of combustion of the fuel in a burner of this type is very slow, so that, notwithstanding the employment of a reservoir of small capacity, combustion at the burner may be maintained for a good many hours. The casing is made of heat conductive material such as metal so that the casing as a whole, including the portion enclosing the fuel reservoir and the cover portion, becomes warm. This casing is referred to hereinafter as the "burner casing."

Inasmuch as hand warming devices of the character referred to have heretofore been made and sold and are well known, further details as to the structure and materials used in the burner as such and as to the type of fuel reservoir employed will not be set forth herein. However, it may be mentioned that the fuel usually is communicated from the burner to the reservoir via a wicklike body of absorbent fibrous material.

It is an object of this invention to improve upon body warming devices of the character aforesaid adapted to be carried on the person of the user.

A more particular object of this invention is to enhance the utility and effectiveness of a body warming device when carried on the person of the user.

Further objects and features of this invention relate to the provision of means whereby a body warming device may be carried for application of heat to a particular part of the body such as the wrist or forearm, although this invention is also of utility for carrying a body warming device for application of heat to some other part of the body such as the neck, leg or the like.

Further objects and features of this invention relate to means whereby a body warming device of the character described may be held in proximity to a part of one's body while being readily attached so as to be so held and detached by virtue of the coaction of the parts of the body warming device.

Further objects and features of preferred embodiments of my invention relate to the provision of means for varying the heat conducted from the burner casing to a body part to be warmed by the device, and further objects and features of my invention relate to means for accomplishing such varying of heat conductivity while the body warming device remains in place.

Further objects and features of this invention relate to means whereby the amount of heat imparted to a body part by the warming device may be varied through a plurality of different heat intensities while the heat of combustion at the burner per se remains constant.

Further objects and features of this invention relate to the provision of means whereby the distribution of heat from a casing having a burner therein may be more effectively distributed for application to a body part to be warmed.

Further objects and features of this invention relate to the provision of a body warming device such that there is direct conductivity of part of the heat produced by the burner to a body part to be warmed while another part of the heat generated by the burner is dissipated into the air for transmission to adjoining areas of the body.

Further objects and features of this invention relate to a body warming device comprising a carrier adapted to be attached to the body part and means for ready removal of the burner casing from the carrier device.

More general objects and features of this invention relate to the provision of body warming devices which, as compared with the conventional pocket hand warmer, have greatly enhanced utility particularly for outdoor use by sportsmen, military personnel and the like. A body warming device embodying this invention may be worn on the wrist, for example, so as to supply heat in a very efficient manner to the veins and arteries which are near the surface in this portion of the body, the result being an immediate and intimate communication of heat so as to effectively warm the circulating blood. In this way the heat is employed much more effectively as compared with a small unit carried loosely in one's pocket.

For such usage while held in intimate contact with a part of the body such as one's wrist, the matter of heat adjustment is of major concern. According to my invention, the matter of adjustment of heat intensity has been afforded not withstanding the fact that the heat generated at the burner per se remains constant. Thus, according to my invention, instead of attempting to regulate the burner, means is provided for selectively controlling the amount of heat conducted from the burner to the body part to be warmed. The adjustment of intensity of the heat may be accomplished by different expedients in the practice of my invention, as will be pointed out more in detail hereinbelow in connection with the embodiments of my invention shown in the drawings. Thus means may be provided for selective interposition of material having different rates of thermal conductivity between the burner casing and the body part to be warmed. The material having such thermal conductivity may be a solid material or it may be air, suitable means being provided when air is the thermal insulating material for adjusting the thickness of the air layer between the casing of the device and the body part to be warmed. In preferred embodiments of this invention, the casing is provided with a plurality of heated surfaces and means is provided whereby different surfaces of the casing may be brought selectively into juxtaposition with the body part to be warmed.

Preferably the body warming device of this invention comprises spaced holding means to which a strap, band or other tying means may be attached for holding the body warming device in place on one's wrist or other body part. The burner casing is disposed between the spaced holding means and preferably a heat conductive plate is provided for interposition between the burner casing and the body part to be warmed. By employing a heat conductive plate, such as a metal plate, between the burner casing and the body part to be warmed much improved diffusion of the heat is afforded so that notwithstanding the employment of a small casing which otherwise would have a very limited and localized heating surface, the heat may be effectively distributed over a substantially larger area and thus more comfortably brought into conductive relation with the body part to be warmed.

In preferred embodiments of my invention the casing which encloses the burner is detachable from suitable holding means, preferably employing a heat conductive plate as aforesaid, so that the casing may be readily detached and put in place again and so that in preferred embodiments the casing may be rotated for effectively varying the intensity of heat brought to bear on the body part to be warmed.

Further objects and features of this invention will be apparent from the following description of certain embodiments of my invention which have been shown for illustrative purposes in the accompanying drawings, wherein:

FIG. 10 is a perspective view of an alternative embodiment of this invention illustrating alternative means for varying thermal conductivity to the body part to be warmed when employing a rotatively mounted burner casing;

FIG. 11 is a perspective view from a different position and on a smaller smale of the casing structure employed in the embodiment of FIG. 10;

FIG. 12 is an enlarged detail sectional view showing the thermal contact provided between the casing and the underlying plate according to the embodiment of FIGS. 10 and 11;

FIG. 13 illustrates a further embodiment of this invention whereby four adjustments in temperature are provided utilizing a rotatively mounted casing;

FIG. 14 is a section taken on the line 14—14 of FIG. 13 showing one relative position of the parts;

FIG. 15 is similar to FIG. 14 but with the parts in a different position; and

FIG. 16 is a side elevation detail view of the means permitting turning or release of the burner casing for the embodiment shown in FIGS. 13, 14 and 15.

Figure 2:
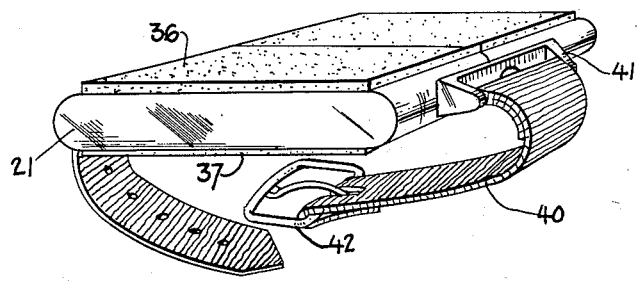
FIG. 2 is a perspective view of an alternative embodiment of this invention which is similar to that shown in FIG. 1 as regards the heater casing, the securing means of FIG. 2, however, requiring removal of the device for reversing the position of the casing.

In the accompanying drawing the casing which contains the burner and the fuel therefor may be similar to that which is well known in the art as a pocket hand warmer.

In the drawings the casing in its various forms is indicated by the reference character 21. As is conventional in such pocket hand warmers, the casing may comprise a reservoir portion and a cover portion that is telescopically removable from the reservoir and that when in place covers the burner which is mounted on top of the fuel reservoir comprised in the reservoir portion and which is in contact with a surrounding air space that is within the confines of the cover. In such warmers, as, for example, that of Patent No. 2,579,620 the burner commonly consists of a catalyst-carrying foraminous material that is in communication with the fuel supply and that when ignited slowly burns with a glow that gives off heat that is transmitted to both the cover portion and the reservoir portion of the casing which, being made of suitable heat-conductive metal, becomes warm throughout the entire area of its surface. In order to maintain combustion outside air must, of course, be in communication with the burner and for this purpose suitable apertures are provided usually in the cover. The fuel supply sometimes is maintained in a removable casing that has the burner on top and that is open at the bottom for supplying fuel to loose absorbent material that is stuffed therein and that holds the combustible liquid thereon. Alternatively, the reservoir portion may be supplied with a filling aperture which may be closed with a suitable, readily removable closure. Such pocket warmers of the kind in question are conventional and further description is not regarded as necessary. Moreover, the construction and configuration of the casing may be varied as desired in the practice of this invention.

Figure 1:
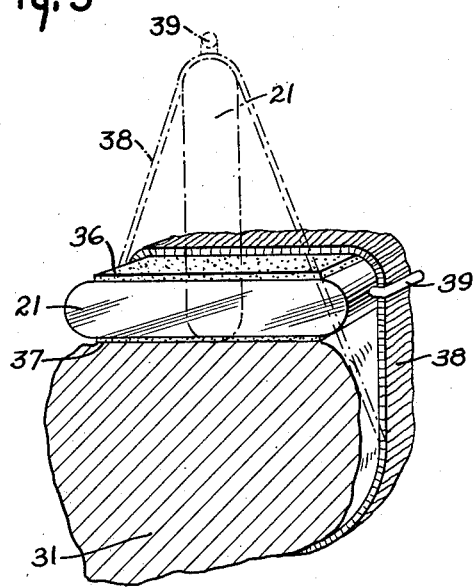
FIG. 1 is a perspective view of one embodiment of this invention comprising means whereby a body warming device may be worn on the arm, the device being adapted to be worn on the arm, for example, of the wearer with either of the opposite sides of the casing facing the body part to be warmed.

In the practice of this invention the warmer is held in place and may be in direct contact with the skin or it may have the sleeve of a shirt or the like interposed between the burner casing and the skin. In either case, this invention enables the wearer to vary or lessen the amount of heat transmitted to the body part to be warmed. In FIG. 1 one means for providing two different intensities of heat which may optionally be selected by the wearer has been shown. The burner casing 21 is provided on one side with thermal heat insulating material 36. The thermal heat insulating material may take many different forms. Thus a fibrous sheet may be attached to the burner casing 21 by a suitable cement. Alternatively, there are relatively poor heat conducting materials which may be applied to the burner casing as a composition which sets up and hardens so as to be an integral portion of the surface of the casing. Since a number of different thermal heat insulating materials are well known, further description and exemplification of such materials is not deemed to be necessary herein. In any case, it is significant that the opposite surfaces of the body warming device have different thermal conductivity. Thus, the thermal heat insulation material 36 may be applied to one side only of the casing 21 while the other side has no thermal heat insulation material at all applied thereto. On the other hand, if the metal of the casing is uncomfortably warm when in direct contact with the skin of the wearer, thermal heat insulation material 37 may be applied to the opposite surface of the casing 21, but using a substantially different thickness so that the surface covered by the layer 36 will have a substantially different temperature as compared with the surface presented by the layer 37.

In FIG. 1 the securing means shown is in the form of the holding band 38 which is made of readily stretchable material. The holding band 38 passes under the bar 39, which is secured to each side of the casing 21, so that if the wearer desires to reverse the position of the casing 21, the casing 21 may be moved for this purpose through the position shown in dotted lines in FIG. 1, the stretchability of the holding band 38 permitting this movement. The bar 39 may be attached either to the cover portion or the reservoir portion of the casing 21, or held at one end by one of these portions and held at the other end by the other of these portions, suitable means being provided for permitting the separation of the casing portions.

In FIG. 2 the burner casing and thermal insulation layers 36 and 37 are the same as above described in connection with FIG. 1. FIG. 2 illustrates that if desired the holding band 40 may have its ends secured to suitable holding members 41 and when the body warming device is constructed as shown in FIG. 2 the position of the casing 21 is reversed by detaching the entire device from the arm of the wearer and reattaching it with the casing in reversed position. The holding band may be made of stretchable material or it may be provided with a conventional securing device such as the buckle 42.

Figure 3:
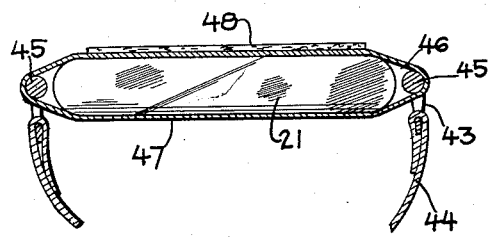
FIG. 3 is a transverse view, partly in section, of an alternative embodiment of this invention showing means for varying the thermal conductivity of material between the burner casing and the body part to be warmed.
Figure 4:
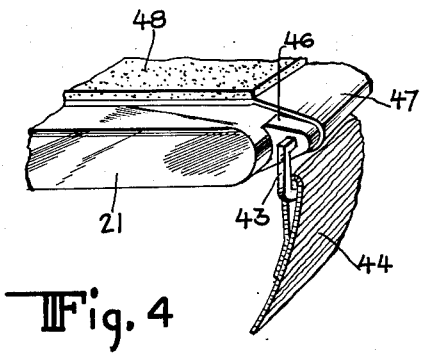
FIG. 4 is a detailed perspective view on an enlarged scale of the embodiment shown in FIG. 3.

In the embodiment shown in FIGS. 3 and 4, the burner casing 21 is provided with holding means 43 for the holding band 44, and in addition to the holding means, there is a bar 45 adjacent each edge of the casing 21 which is held in position by the projecting lugs 46. The band of thermal insulating material such as the fabric strip 47 passes freely over the bars 45 so that the band 47 may be moved longitudinally of itself relative to the casing 21. Secured to the band 47 there is a sheet or a layer 48 of thermal heat insulating material. When the band 47 is in the position shown in FIGS. 3 and 4, heat from the casing 21 is transmitted therethrough to the body part to be warmed. If it is desired to diminish the amount of heat, then, without removing the device, the band 47 may be manipulated so as to move the sheet 48 which presents the surface that is on the exposed side of the device so as to bring it between the casing 21 and the body part to be warmed.

Figure 5:
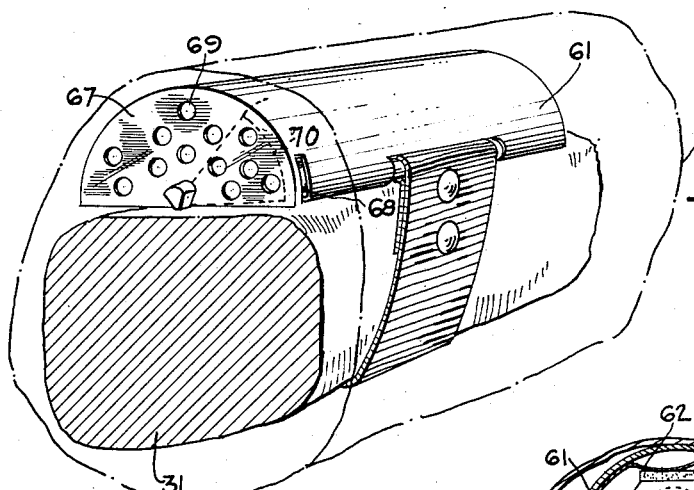
FIG. 5 is a perspective view of a further embodiment of this invention which provides four adjustments as regards temperature control and which includes a protective housing for the burner casing.
Figure 6:
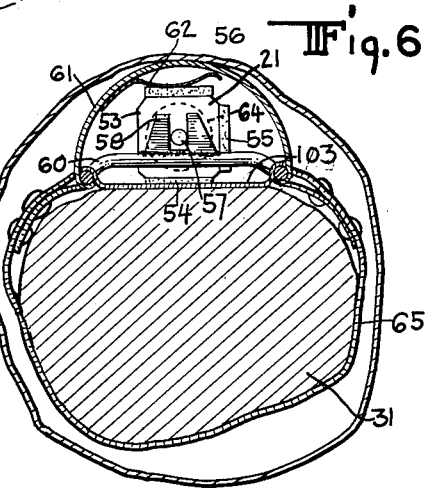
FIG. 6 is an end view of the embodiment shown in FIG. 5 with part of the protective guard housing removed in order to show the structural parts within the guard housing.
Figure 7:
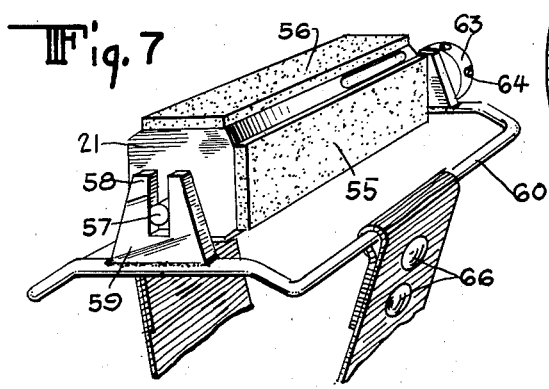
FIG. 7 is a perspective view of the embodiment shown in FIGS. 5 and 6 with the guard housing removed.

In its preferred form the body warming device of my invention is such as that more than two adjustments are possible and for this reason I prefer to employ a 4-sided burner casing, one type of arrangement utilizing a 4-sided burner casing being shown in FIGS. 5, 6 and 7. In FIGS. 5, 6 and 7 the casing 21 is substantially square and presents the surface 53 which does not carry any thermal heat insulation material, the surface 54 of a thin layer of thermal heat insulation material, the surface 55 of a layer of thermal heat insulation material thicker than layer 54, and the surface 56 of a layer of heat insulation material thicker than layer 55. At each end of the casing 21 there is a lug 57 which is carried within the open-topped slot 58 contained in the members 59 upstanding from each end of the frame 60. The tube cover 61 is adapted to be slid over the frame 60 to the position best shown in FIG. 6 and when in the position shown in FIG. 6 the resilient spring member 62 serves to normally hold the casing 21 downwardly toward the wrist 31 or other part of the body. One of the lugs 57 is provided with a knob 63 which protrudes from the casing and permits the wearer to rotate the casing 21 so as to selectively bring any of the faces 53, 54, 55 and 56 into opposed position with the wrist 31. In this way four different intensities of heat may be selectively provided. By placing differently contoured projections 64 on the knob 63, the user can by touch as well as appearance select the particular face of the casing which he wishes to have disposed oppositely to the body part to be warmed. If desired, the knob 63 also may have marks thereon indicating which is low heat, which is high heat and which are intermediate. In assembling the device the guard tube 61 may be slid over the frame 60 and the holding band 65 may be passed under the frame 60 and held in place as by snap fasteners 66.

If desired, at each end of the guard tube 61 there may be a closure plate 67 which may be merely slid into place and frictionally held by friction lugs 68 or the like. In such case, the guard plate 67 must be provided with apertures to permit ingress of air into the region of the burner in order to support combustion and complementary diffusion of air mixed with products of combustion back into the surrounding atmosphere and the apertures 69 shown in FIG. 5 serve this purpose. The guard tube 61 also provides a cover whereby the mixture of air and products of combustion therewithin receive heat from the burner and become warmed, and the diffusion of the warmed mixture back into the surrounding atmosphere through the holes 69 has the effect of warming areas of the body adjacent the warming device. The size and number of apertures 69 determine the extent of such diffusion of warm air. If desired, a second plate 70 may be provided in contiguous relation with the plate 67 having apertures therein which may be mounted for movement into and away from registration with the apertures 69. In this way the diffusion of air from the warming device within the confines of the sleeve 71 of the wearer may be controlled as desired. Preferably plate 103 (shown in FIG. 6 only) is provided having margins resting on frame 60.

Figure 9:
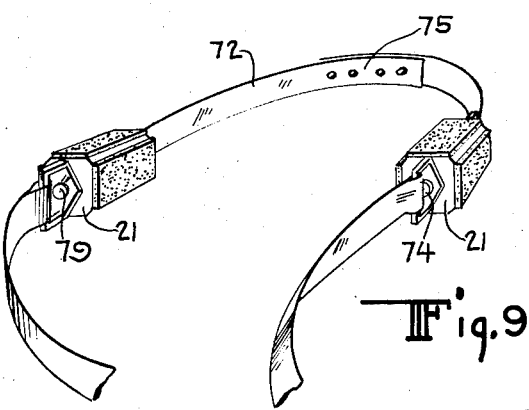
FIG. 9 is a perspective view of the holding means shown in FIG. 8.
Figure 8:
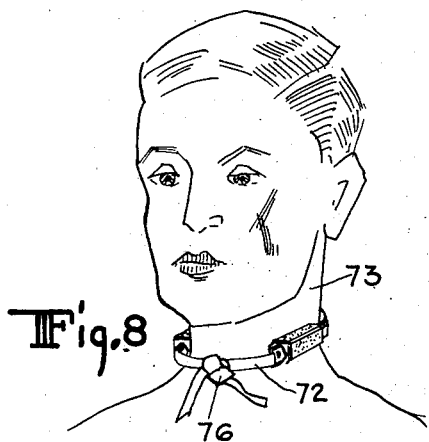
FIG. 8 is a perspective view showing an adaptation of a body warming device embodying this invention to another part of the body, namely, the neck.

In FIGS. 8 and 9 there are two burner casings 21 which are 4-sided as shown in connection with FIGS. 5, 6 and 7 and described hereinabove, but these burner casings are comprised in a holding band 72 for holding them in opposed relation to the wearer's neck 73. The ends of the casing 21 are provided with swivel connections 74 to the holding band 72 so that the casings may be rotated for selectively bringing the surfaces into opposed relation to the neck depending upon the amount of heat desired. Suitable adjusting means, indicated at 75, may be provided and, as shown in FIG. 8, the ends of the holding band 72 may be merely tied with a knot 76 similarly to a scarf or the like.

In the embodiment shown in FIGS. 5 to 9 the casing presents surfaces covered with different thicknesses of heat insulation material for providing in this manner different amounts of thermal insulating material between the burner casing and the body part to be warmed. An alternative means for accomplishing a similar result is shown in FIGS. 10, 11 and 12. It is preferable in the practice of this invention to provide a plate of heat-conductive material which is held in abutting relation to the body part to be warmed by the holding means of the warming device. Such a plate 77 is shown in FIG. 10. At each end of the plate 77 there is an upturned margin 78. The casing 21 has a pin 80 protruding from each end which is carried in a slot 81 in each of the arms 83. There is rigidly held by each of the end portions 78 of the plate 77 a rod 82 having rigidly secured thereto adjacent each end the holding arm 83, the outer end of which is adapted to overlie the pin 80 at each end of the casing 21 and normally tend to hold the pin 80 in the slot 81, the arms 83 being normally urged to do so by the spring 84. This construction permits the casing 21 to be rotated relatively to the plate 77 by gripping the casing 21 itself or by gripping a knob secured to one of the pins 80. Whenever it is desired to remove the casing 21, the arms 83 may be moved out of the way and for this purpose the finger piece 85 may be provided at the outer end of one or both of the arms 83.

As best shown in FIG. 11, the surfaces presented by the casing 21 have projections protruding therefrom, the number of these projections being different for each surface of the casing 21. Thus one surface has none of these projections, while the other surfaces have different numbers of projections. It is apparent that when the surface having none of the projections is in contact with the plate 77 maximum heat conductivity through the plate 77 to the body part to be warmed is provided. When the projections are interposed between the casing 21 and the plate 77 as shown in FIG. 12, then the amount of metal through which heat may be conducted is varied, depending on the number of projections on the surface in question, the amount of conductivity being reduced when the number of projections through which heat may be transmitted through a good conductor such as metal, the thermal insulation between the casing 21 and the plate 77 is correspondingly increased.

A preferred means for selectively varying the conductivity of heat from a burner casing to the body part to be warmed is shown in FIGS. 13, 14, 15 and 16. In this embodiment of my invention the holder for the casing is provided with holding means 86 to which the ends of the holding band 87 are attached. The metal plate 88 is comprised in the holding means that normally is held against the body part 89 to be warmed by the holding band 87.

In the embodiment shown in FIGS. 13, 14, 15 and 16 each of the four surfaces of the burner casing 21 is the same. However, means is provided for selectively spacing these surfaces at different positions of spacing from the plate 88. This is accomplished by securing to each end of the casing the cams 90 having rounded corners. As shown particularly in FIGS. 14 and 15, these cams 90 are such that when the casing 21 is rotated the spacing of the casing from the plate 88 may selectively be set at different positions of spacing from the plate 88. In this way layers of air of different thickness may be interposed between the casing 21 and the plate 88 for adjustably controlling the temperature of the plate 88 at four different settings. For rotatably and yieldably mounting the casing 21 the arms 91 and 92 are pivotally mounted adjacent each end of rod 9a and the outer ends are normally urged downwardly by the resilient spring means 93. At the end of arm 91 there is a pin 94 which may be inserted in the recess 95. The pin 96 at the end of the arm 91a may be inserted in a recess at the other end of the casing 21 similar to the recess 95. However, in order to permit the ready removal of the casing 21, the pin 96 is retractably mounted in the socket 97 within which there is a compression spring 98, and on the extension 99 of the pin 96 a knob 100 may be secured and held in place by the set screw 101. By pulling on the knob 100, the pin 96 may be retracted for permitting removal of the casing 21. The knob 100 preferably is assembled in a fixed rotational position relative to the pin 96 and the pin 96 likewise is adapted to coact with the casing 21 in a fixed rotational position so that indicia on the knob may be associated with predetermined faces of the cams 90.

As best shown in FIGS. 14 and 15, the holding band 87 is provided with the portion 102 which underlies the plate 88 so that, depending on the preferences of the wearer, a fabric material may be disposed in direct contact with the skin rather than a metal plate. Such a fabric material may be utilized in connection with the other embodiments of this invention which have been described hereinabove.

While this invention has been described in connection with certain embodiments of this invention, it is to be understood that this has been done for illustrative purposes and that my invention may be practiced in connection with various embodiments depending on factors such as the number of adjustments as regards temperature control and the desirability for protective guard covers and the control of air diffusion as, for example, that shown in connection with FIGS. 5 to 7. Similar guards and means for controlling air diffusion may be provided in connection with the embodiments of this invention shown in FIGS. 10 to 16. Moreover, the disposition of apertures for permitting air to have access to the burner may be varied and in most of the drawings herein such apertures have not been shown in the interest of clarity in the showing.

The devices disclosed hereinabove have been described and exemplified as being adapted for body warming. However, the devices that have been disclosed likewise may be employed for body cooling by substituting a coolant such as solid carbon dioxide for the burner element. Thus the term "temperature tempering means" embraces either a burner or retaining means adapted for holding a body of solid carbon dioxide or the like, and devices embodying my invention may have utility either for body warming or for body cooling. Moreover, it likewise is within the scope of this invention to provide a casing with a burner that may be removed and replaced by a receptacle for solid carbon dioxide. When the device is employed with a coolant, it may be employed to help counteract the effects of hot weather or may be used under other conidtions where localized cooling is wanted. When the device is used with a coolant, it is advantageous to be able to vary the intensity of the cooling effect consistenly with comfort and the desires of the user.

I claim:

1. A warmer adapted to cooperate with the human body comprising a casing having a burner therewithin and means for supplying fuel and air to said burner, said casing having a plurality of surfaces adapted to be disposed in juxtaposed relation to a part of the human body to be warmed, means for selectively holding each of said surfaces in juxtaposition with the part of the human body to be warmed, and means for varying the conductivity of heat from said casing to said part of the human body according to selection of which of said surfaces is in juxtaposition with respect to said part of the human body.

2. A warming device adapted to cooperate with the human body comprising a casing having a burner therewithin and means for supplying fuel to said burner, means for selectively holding said casing with each of at least two surfaces thereof in juxtaposed relation with respect to a part of the human body to be warmed at substantially different positions of spacing from said part of the human body to be warmed.

3. A warming device for the human body comprising a casing having a burner therewithin and means for supplying fuel and air thereto, a heat conductive plate for contact with a part of the human body to be warmed, means for holding said plate in contact with said part of the human body, means for maintaining said casing and said plate in attached adjacent relation to each other and means for varying the spacing between said casing and said plate.

4. A warming device for the human body comprising a casing having a burner therewithin and means for supplying fuel to said burner, said casing being of substantially square cross section and presenting four generally planar surfaces, a heat conductive plate for contact with a part of the human body to be warmed, means for mounting said casing so as to be resiliently urged toward said plate while permitting rotation of said casing about a longitudinal axis, and cam means secured to the ends of said casing and rotatable therewith for maintaining contacting relation with said plate, said cam means being shaped for selectively disposing said surfaces in positions of varying spacing with respect to said plate upon rotation of said casing about its said longitudinal axis.

5. A warming device for the human body comprising a casing having a burner therewithin and means for supplying fuel to said burner, said casing being an elongated casing of polygonal cross section and having a plurality of exterior faces, means for controlling heat transference from said burner to a part of the human body in juxtaposition with each of said faces in respectively different amounts, and holding means for holding said casing in juxtaposed relation with respect to a part of the human body to be warmed, said holding means comprising means for rotatably mounting said casing for rotation about a longitudinal axis thereof to bring said faces of said casing selectively and respectively into juxtaposed relation with a body part to be warmed.

6. A warming device for the human body according to claim 5 wherein said casing has a knob extending from an end thereof in substantial alignment with said longitudinal axis of rotation for facilitating manual rotation of said casing.

7. A temperature tempering device adapted to cooperate with the human body comprising a casing having temperature tempering means therewithin, said casing having a plurality of surfaces adapted to be disposed in juxtaposed relation to a part of the human body, means for selectively holding each of said surfaces in juxtaposition with the part of the human body, and means for varying the thermal conductivity between said tempering means and said part of the human body according to the selection of which of said surfaces is in juxtaposition with respect to said part of the human body.

References Cited in the file of this patent

UNITED STATES PATENTS

| 136,582 | Bush | Mar. 11, 1873 |
| 156,117 | Angresius | Oct. 20, 1874 |
| 750,060 | Petty | Jan. 19, 1904 |
| 1,663,640 | Pais | Mar. 27, 1928 |
| 2,136,626 | Lind | Nov. 15, 1938 |
| 2,498,983 | D'Albora | Feb. 28, 1950 |
| 2,715,400 | Butler | Aug. 16, 1955 |
| 2,845,924 | Benda | Aug. 5, 1958 |

FOREIGN PATENTS

| 81,109 | Switzerland | May 16, 1919 |
| 153,213 | Great Britain | Nov. 4, 1920 |